Patented Aug. 29, 1950

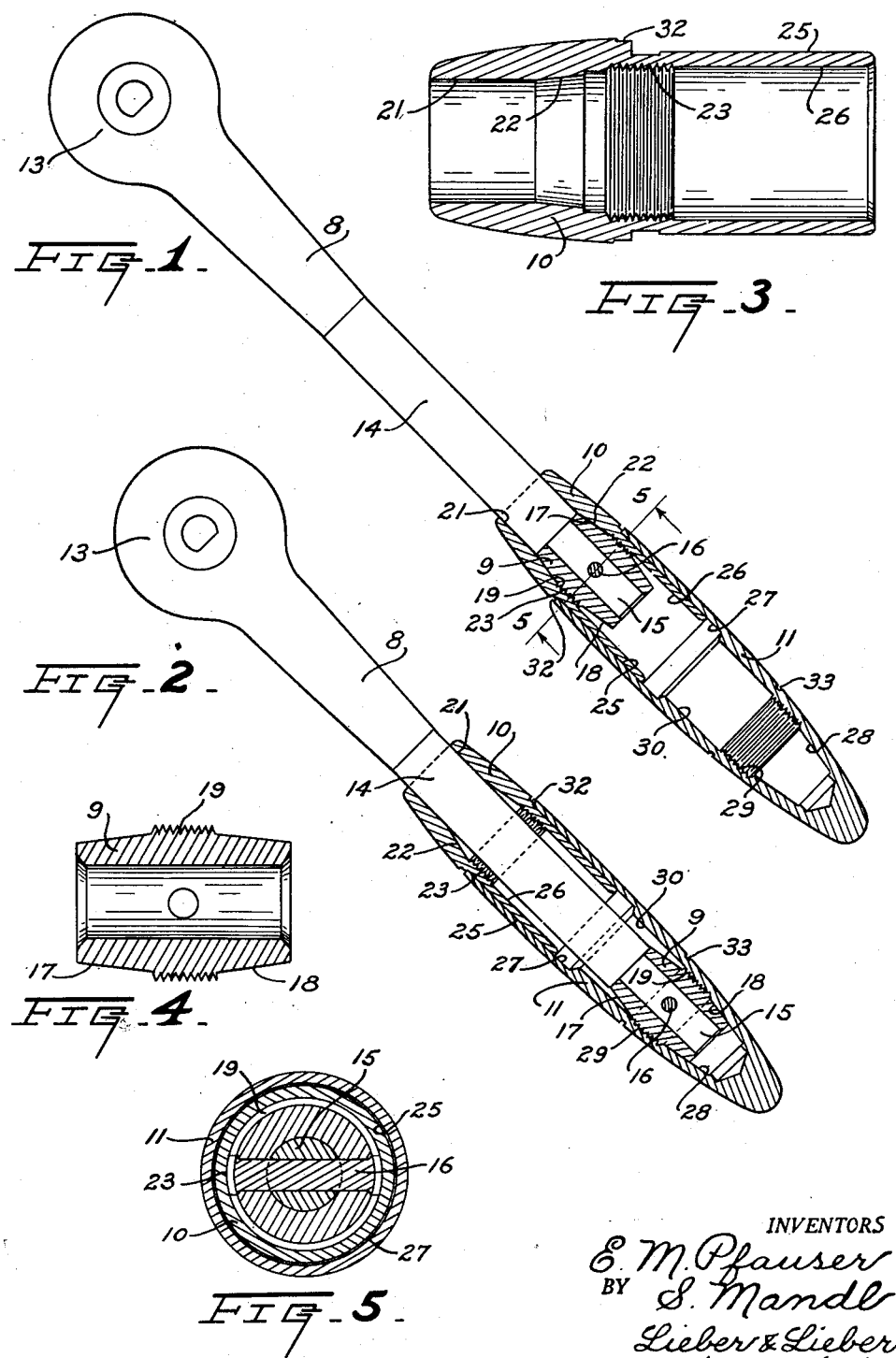

2,520,652

UNITED STATES PATENT OFFICE 2,520,652

ADJUSTABLE TOOL HANDLE

Edward M. Pfauser, Elm Grove, and Siegmund Mandl, Wauwatosa, Wis., assignors to Blackhawk Mfg. Co., Milwaukee, Wis., a corporation of Wisconsin Application February 28, 1948, Serial No. 12,098

10 Claims. (Cl. 74—544)

Our invention relates in general to improvements in tool handles, and relates more specifically to improvements in the construction and operation of manipulating handles for diverse tools such as wrenches and the like.

The primary object of the invention is to provide an improved manipulating handle assemblage for tools such as wrenches, which will enable most efficient actuation of the tools with which the handle is associated.

It has heretofore been proposed, as shown and described in Patent No. 2,282,148 granted May 5, 1942, to provide a tool handle for ratchet and socket wrenches, which is adapted to be adjusted in length in order to facilitate actuation of the tools under different conditions of operation, and to also enable compact packing of such tool assemblages. While this prior handle has proven highly successful, the grip portion of the assemblage was necessarily entirely removed from the handle shank in order to effect adjustment of the handle length, and this separation of the parts frequently resulted in loss of the grip members. Then too, the grip elements of the prior adjustable handles were open at their outer ends, and since these devices are utilized in mussy surroundings, the open handle ends would fill up and become clogged with dirt. In addition to these objections, the grip portions of the previous assemblages were approximately cylindrical throughout their lengths and did not afford effective gripping means, besides being relatively cumbersome to manipulate and unattractive in appearance.

It is therefore a more specific object of our present invention to provide an improved longitudinally adjustable tool handle which obviates all of the objectionable features of the above mentioned previously patented assemblage, while retaining all of the desirable characteristics thereof.

Another important object of this invention is to provide an improved lever type of actuating handle for rotary and oscillatory tools, which may be quickly and effectively lengthened or shortened to vary the leverage or stroke, without dismantling the handle assemblage.

A further relatively specific object of the invention is to provide an improved adjustable tool handle assemblage which is devoid of openings or pockets in which dirt is apt to accumulate, and which also affords an effective grip while presenting a highly attractive appearance.

Still another object of our invention is to provide an improved tool handle structure which may be manufactured and assembled at moderate cost for diverse uses, and which produces a rigid lever arm when adjusted to various lengths.

These and other objects and advantages will appear in the course of the following description.

A clear conception of the features constituting our present improvement, and of the construction and operation of a typical embodiment of the invention, may be had by referring to the drawing accompanying and forming a part of this specification, in which like reference characters designate the same or similar parts in the various views.

Fig. 1 is a part sectional top view of a ratchet wrench having one of the improved handle assemblages applied thereto, a central longitudinal section having been taken through the adjustable handle grip and the assemblage having been adjusted to provide a handle of maximum length;

Fig. 2 is a view similar to that of Fig. 1, but showing the parts adjusted to provide a handle of minimum length;

Fig. 3 is an enlarged central longitudinal section through the forward portion of the sectional handle grip;

Fig. 4 is a similarly enlarged central longitudinal section through the tapered attaching and connecting element of the adjustable handle assemblage; and Fig. 5 is a likewise enlarged transverse section through the assembly of Fig. 1, taken along the line 5—5.

While the improved adjustable handle has been shown herein as having been applied to a particular type of oscillatory tool, it is not our intention to unnecessarily restrict the scope or utility of the invention by virtue of this limited disclosure, and it is also contemplated that specific descriptive terms used herein be given the broadest possible interpretation, consistent with the disclosure.

With the reference to the drawing, the typical improved handle comprises in general four parts, namely, a lever arm 8, a tapered element 9, and a composite grip member composed of front and rear sections 10, 11 respectively. The elongated lever arm 8 has a tool 13 such as a ratchet socket or plug associated with one end thereof, and is provided at its opposite swinging end with a cylindrical shank 14 having a reduced cylindrical extreme end portion 15 formed integral therewith, as shown in Figs. 1, 2 and 5. The tapered collar element 9 is centrally bored to snugly fit the lever arm portion 15 and may be firmly attached thereto as by means of a transverse rivet pin 16; and the opposite ends of this bored element 9 are provided with front and rear similarly tapered external frustro conical surfaces 17, 18 respectively, while the medial portion of the element has external screw threads 19 formed thereon, see Figs. 1, 2 and 4.

The front section 10 of the composite grip member is shown in detail in Fig. 3, and is provided at its forward end with an internal bore 21 adapted to snugly but slidably engage the cylindrical periphery of the lever arm shank 14, and with an internal tapered surface 22 adjoining the bore 21, while the medial portion of this section 10 has internal screw threads 23 and the opposite end thereof has outer and internal cylindrical surfaces 25, 26 respectively, the latter of which is of sufficient diameter to permit passage of the element 9 therethrough. The rear section 11 of the grip member is shown in Figs. 1, 2 and 5, and this section is provided at its front end with a bore 27 normally having slightly smaller internal diameter than the external diameter of the outer surface 25 of the complementary section 10, while the rear portion of the section 11 has an internal tapered surface 28 and adjoining internal screw threads 29, and the medial part of the rear grip section 11, has a bore 30 corresponding in diameter to the bore 27 of the front section 10.

The exterior of the composite grip member is preferably smoothly and gracefully curved as illustrated in Figs. 1 and 2, and this curvature may be interrupted by several annular grooves 32, 33 the former of which is formed between the sections 10, 11 near the forward portion of the handle member while the latter is formed in the rear portion of the section 11. The various parts of the assemblage may be conveniently and accurately constructed of durable metal with the aid of standard machines, and the external curved surface of the rear section 11 between the grooves 32, 33 is preferably enamelled or plated to present a highly finished and attractive appearance.

When the several parts of the improved handle have been accurately constructed as above described, they may be readily assembled in the following manner. The section 10 of the composite handle member should first be slipped over the shank 14 of the lever arm 8, after which the tapered element 9 should be applied to the reduced end portion 15 of the shank and firmly attached thereto by application of the rivet pin 16. The forward tubular portion of the other grip section 11 should then be heated to cause it to expand sufficiently to allow the bore 27 to be telescoped over the external surface 25 of the front section 10 after the latter has been screwed onto the element 9, and upon subsequent cooling of the heated tubular end of the section 11 this end will be shrunk firmly to the section 10 as depicted in Figs. 1 and 2, thus completing the assembly.

After the handle structure has been thus properly assembled, the internal screw threads 23 of the grip member section 10 may be applied to the external threads 19 of the element 9 so as to cause the bore 21 to ride rearwardly along the shank 14, until the tapered bore 22 snugly engages the correspondingly tapered element surface 17, whereupon a rigid handle of maximum length is produced, as in Fig. 1. However, in order to produce a handle of minimum length as in Fig. 2, it is only necessary to unscrew the threads 23 from the screw threads 19, to thereafter slide the grip member bore 21 forwardly along the shank 14, and to finally apply the internal screw threads 29 of the grip member section 11 until the tapered bore 28 snugly engages the correspondingly tapered element surface 18. In both of these adjusted positions, the grip member is firmly attached to the shank 14 while the adjusting and fastening structure is totally confined within the permanently united sections 10, 11.

From the foregoing detailed description it should be apparent that our present invention provides a sturdy and simple longitudinally adjustable handle applicable to diverse tools. Adjustment of the handle length may be quickly effected without removing parts of the assemblage, and the screw threads and other connecting elements are at all times concealed and well protected against damage and dirt. When the handle has been shortened to the greatest possible extent, the assemblage will occupy minimum space for compact storage; and when the handle is lengthened to the greatest possible extent, maximum leverage is obtained. The shortening of the handle also permits manipulation of the tool 13 in cramped quarters, and the simplicity of the entire assemblage enables production thereof at relatively low cost. The streamlining and external decoration of the grip member produces an attractive appearance while also providing a comfortable and effective grip, and the several parts of the handle structure may be readily assembled and subsequently adjusted.

It should be understood that it is not desired to limit this invention to the exact details of construction or to the precise mode of assembly and operation, herein shown and described, for various modifications within the scope of the appended claims may occur to persons skilled in the art.

We claim:

1. A variable length tool handle comprising, a tool actuating shank provided near its free end with a pair of oppositely tapered frustro-conical external surfaces, and a grip member having a portion snugly slidably cooperable with said shank and being provided with spaced front and rear internal tapers alternately snugly engageble with said tapered shank surfaces.

2. A variable length tool handle comprising, a tool actuating shank provided near its free end with a pair of oppositely tapered frustro-conical external surfaces, and a grip member having a portion snugly slidably cooperable with said shank and being provided with spaced front and rear internal tapers alternately snugly engageable with said tapered shank surfaces, said grip member also having means adjacent to each of said tapers for attaching the member to said lever shank between said tapered surfaces.

3. A variable length tool handle comprising, a cylindrical tool actuating shank provided near its end remote from the tool with a pair of external oppositely tapered frustro-conical surfaces separated by an intervening space, and a grip member having a bore snugly slidably embracing said shank and being provided with more remotely spaced front and rear internal tapers alternately snugly engageable with said tapered shank surfaces.

4. A variable length tool handle comprising, a cylindrical tool actuating shank provided near its end remote from the tool with a pair of external oppositely tapered frustro-conical surfaces separated by an intervening space, and a grip member having a bore snugly slidably embracing said shank and being provided with more remotely spaced front and rear internal tapers alternately snugly engageable with said tapered shank surfaces, said grip member and said shank also having means adjacent to said tapers and in the space between said tapered surfaces for uniting the member and the shank.

5. A variable length tool handle comprising, a cylindrical tool actuating shank provided near its free end with a pair of external oppositely tapered frustro-conical surfaces and intervening external screw threads, and a grip member having a bore snugly slidably embracing said shank, said member also having front and rear internal tapers alternately engageable with said tapered shank surfaces and being provided with adjacent internal screw threads alternately cooperable with said intervening threads.

6. A variable length tool handle comprising, a cylindrical tool actuating shank provided near its free end with a pair of external oppositely tapered frustro-conical surfaces and intervening external screw threads, a hollow grip member having a bore snugly slidably embracing said shank and also having front and rear internal tapers alternately engageable with said tapered shank surfaces, and internal screw threads within said member for alternately attaching the member to said shank screw threads and for and forcing the adjacent tapers and tapered surfaces into snug engagement.

7. A variable length tool handle comprising, a tool actuating shank, an element of greater external diameter than said shank secured to the free end of the latter and having thereon a pair of oppositely tapered external frustro-conical surfaces, and a hollow grip member having one end snugly slidably engaging said shank and being provided with front and rear internal tapers alternately snugly engageable with said element surfaces.

8. A variable length tool handle comprising, a tool actuating shank, an element of greater external diameter than said shank secured to the free end of the latter and having thereon a pair of oppositely tapered external frustro-conical surfaces, and a hollow grip member having one end snugly slidably engaging said shank and being provided with front and rear internal tapers alternately snugly engageable with said element surfaces, said grip member being formed of several telescopic sections united so as to completely enclose and conceal said tapered surfaces and said tapers.

9. A variable length tool handle comprising, a cylindrical shank, an element of greater external diameter than said shank secured to the free end of the latter and having thereon a pair of oppositely tapered annular frustro-conical surfaces separated by external screw threads, and a hollow grip member having a bore snugly slidably engaging said shank and being provided with spaced internal tapers and adjacent internal screw threads alternately engageable with said element surfaces and threads.

10. A variable length tool handle comprising, a cylindrical shank, an element of greater external diameter than said shank secured to the free end of the latter and having thereon a pair of oppositely tapered annular frustro-conical surfaces separated by external screw threads, and a hollow grip member having a bore snugly slidably engaging said shank and being provided with spaced internal tapers and adjacent internal screw threads alternately engageable with said element surfaces and threads, said grip member being formed of two telescopic sections firmly united so as to completely enclose and conceal said tapers and said surfaces and said screw threads.

EDWARD M. PFAUSER.
SIEGMUND MANDL.

REFERENCES CITED

The following references are of record in the file of this patent:

UNITED STATES PATENTS

| Number | Name | Date |
|---|---|---|
| 732,858 | Irland | July 7, 1903 |
| 966,182 | Erickson | Aug. 2, 1910 |
| 2,334,057 | Ashton | Nov. 9, 1943 |